US008582648B2

(12) United States Patent
Berman et al.

(10) Patent No.: US 8,582,648 B2
(45) Date of Patent: Nov. 12, 2013

(54) SYSTEM AND METHOD FOR SELECTIVE IMAGE CAPTURE, TRANSMISSION AND RECONSTRUCTION

(75) Inventors: Steven T. Berman, New York, NY (US); Paul F. Greier, Carmel, NY (US); Kenneth C. Ho, Yorktown Heights, NY (US); Richard I. Kaufman, Somers, NY (US); Alphonso P. Lanzetta, Marlboro, NY (US); Michael P. Mastro, Yorktown Heights, NY (US); Steven Edward Millman, Spring Valley, NY (US); Ron Ridgeway, New Milford, CT (US); Kai Schleupen, Yorktown Heights, NY (US); Steven Lorenz Wright, Cortlandt Manor, NY (US)

(73) Assignee: International Business Machines Corporation, Armonk, NY (US)

( * ) Notice: Subject to any disclaimer, the term of this patent is extended or adjusted under 35 U.S.C. 154(b) by 1203 days.

(21) Appl. No.: 12/372,458

(22) Filed: Feb. 17, 2009

(65) Prior Publication Data
US 2009/0167948 A1    Jul. 2, 2009

Related U.S. Application Data

(63) Continuation of application No. 11/053,648, filed on Feb. 8, 2005, now Pat. No. 7,492,821.

(51) Int. Cl.
*H04N 7/12* (2006.01)
*G06K 9/36* (2006.01)

(52) U.S. Cl.
USPC ...................................... 375/240.1; 382/232

(58) Field of Classification Search
CPC ....................................................... H04N 7/50

USPC .......... 375/240.01–240.29; 382/232, 239, 294
See application file for complete search history.

(56) References Cited

U.S. PATENT DOCUMENTS

| 6,252,989 | B1 * | 6/2001 | Geisler et al. | 382/232 |
|---|---|---|---|---|
| 6,829,391 | B2 * | 12/2004 | Comaniciu et al. | 382/243 |
| 7,027,655 | B2 * | 4/2006 | Keeney et al. | 382/239 |
| 7,075,535 | B2 | 7/2006 | Aguera y Arcas | |
| 7,130,490 | B2 * | 10/2006 | Elder et al. | 382/294 |

(Continued)

FOREIGN PATENT DOCUMENTS

| CA | 2 321 015 A1 | 3/2002 |
|---|---|---|
| EP | 0 862 329 A1 | 9/1998 |
| WO | WO 99/51035 | 10/1999 |
| WO | WO 03/034740 | 4/2003 |

*Primary Examiner* — Gims Philippe
(74) *Attorney, Agent, or Firm* — F. Chau & Associates, LLC; Louis J. Percello, Esq.

(57) ABSTRACT

A video processing method and system for generating a foveated video display with sections having different resolutions uses a network channel for communicating video images having video sections of different resolutions, and includes a video transmission system for processing and transmitting the received video images over the network channel. The system assigns a larger portion of the network channel's bandwidth to a video section with higher resolution. Further, the system includes a video receiving system for receiving and seamlessly combining the first and second video sections of different resolutions to form an output video image on a display device, and a control unit for sending one or more video control parameters to the video transmission system to control capturing, transmitting and processing of the video images.

18 Claims, 7 Drawing Sheets

(56) References Cited

U.S. PATENT DOCUMENTS

| | | |
|---|---|---|
| 7,872,635 B2 | 1/2011 | Mitchell |
| 2002/0049879 A1 | 4/2002 | Eyer |
| 2003/0099291 A1 | 5/2003 | Kerofsky |
| 2004/0104755 A1 | 6/2004 | Suzuki |
| 2004/0122888 A1 | 6/2004 | Carmichael |
| 2004/0227699 A1 | 11/2004 | Mitchell |
| 2004/0233219 A1 | 11/2004 | Aguera y Arcas |
| 2005/0018911 A1 | 1/2005 | Deever |

* cited by examiner

SYSTEM AND METHOD FOR SELECTIVE IMAGE CAPTURE, TRANSMISSION AND RECONSTRUCTION

CROSS-REFERENCE TO RELATED APPLICATIONS

This is a Continuation Application of U.S. application Ser. No. 11/053,648, filed on Feb. 8, 2005 now U.S. Pat. No. 7,492,821, the disclosure of which is herein incorporated by reference in its entirety.

STATEMENT REGARDING FEDERALLY SPONSORED RESEARCH OR DEVELOPMENT

This invention was made with Government support under Agreement DAAD19-02-2-0023 awarded by Army Research Lab (ARL). The Government has certain rights to the invention.

TECHNICAL FIELD

The present invention generally relates to video and data communications, and more particularly to capturing, transmitting and reconstructing high-resolution video data in applications which demand either or both low bandwidth and low power.

DISCUSSION OF THE RELATED ART

Transmission of high-resolution video images over communication channels requires a large amount of channel bandwidth. The large bandwidth requirements are a result of high data rates required to communicate high-resolution video data, particularly as the video image information content is increased from 640×480 (NTSC) to 1920×1080 (HDTV) and beyond, needed for many applications. Digital video cameras today can capture images more than four times larger than HDTV. The large bandwidth requirement is imperative unless techniques such as compression are applied to the video data. The problem of communicating video data signals is further compounded in situations where available channel bandwidths differ at various stages in the capture, transmission and reconstruction of the video data, or where available channel bandwidth may be changing over time. For portable imaging applications, power consumption is a major issue. Power consumption in video imaging systems depends primarily on the amount of processed video pixel data, and applies to all portions of the imaging chain, namely capture, compression, transmission, and reconstruction. Hence, reducing the bandwidth and power requirements remains an important objective in the area of video communications.

A common approach to reducing bandwidth requirements in video transmission is to use image compression. Compression techniques typically compress entire images, with compression ratios and resulting image quality chosen for a given application and nature of image content. Compression methods can be adapted to respond to changes in image aspects, however, these methods cannot not be considered as intelligent processing of the video image, such as that performed by the visual system of a human observer.

In the human visual system, a large number of photoreceptors is concentrated in the foveal region of the eye. As the eyes dart between various regions of interest in the image, only a small region of the image, near the fixation point, is processed by the human visual system to contain high-resolution image information. Compression techniques process the entire image even if only small regions of interest need to contain high-resolution visual data. In some systems, an attempt is made to enhance the image content by creating a magnified portion of the image within the overall field of view. However, the magnified region necessarily blocks adjacent, un-magnified background regions. For surveillance applications, use of a magnified region reduces situational awareness, and for other imaging applications, use of a magnified region reduces navigation ability.

Efforts have been made to create foveated displays and supporting systems to reduce data rates. These systems display higher image information content within a region of interest, the location of which is set by an eye-tracking device, worn by the user. Typically, a filter is applied to the video data to define the region of interest, in which image quality falls off gradually for pixel data further from the center of the region of interest.

Overall, efforts to create foveated displays have remained unsatisfactory for many applications. If the distance between the image capture device and display is large enough to cause a signal delay more than a few milliseconds, the utility of a system containing an eye-tracking device is very limited. Eye-tracking devices tend to be cumbersome, expensive, and require calibration for good performance.

Conventional foveated video imaging systems do not provide real-time controls to allocate available bandwidth to various portions of the video image data, or adapt to changes in the available bandwidth. These systems do not provide independent control of the resolution of portions of the video data, namely spatial sampling, temporal sampling, compression, and color bit-depth. Finally, none of these systems contain provisions for buffering the video data, with partial-frame packetization, encoding, or encryption of digital video data, suitable for either wireless transmission or wired transmission over a network. For surveillance applications, it is important to have a seamless image presentation of multiple regions of interest, with user or other software control for monitoring and tracking targets.

Hence, there is a need for a video communication system that requires relatively lesser bandwidth and power. Such a system would need to be able to provide independent control of the resolution of portions of the video data, namely spatial sampling, temporal sampling, compression, and color bit-depth.

The need to optimize bandwidth utilization in video imaging systems has existed for some time. Early work focused on spatial and temporal sampling (for example, U.S. Pat. No. 4,004,084, to Brown) and image segmentation (for example, U.S. Pat. No. 4,494,144 to Brown) to efficiently use bandwidth in video applications. Another approach deals with foveated displays where more image information content is provided near the user's visual system fixation point. Examples are U.S. Pat. Nos. 5,621,429 and 5,880,728 to Yamaashi; U.S. Pat. No. 6,178,204 to Hazra; U.S. Pat. No. 6,252,989 to Geisler. However, this approach uses fixed, automatic signal processing to minimize bandwidth requirement within the imposed constraints.

SUMMARY

In one aspect of the present invention, a video processing system and method are disclosed for capturing, transmitting, and reconstructing video images, and communicating capture and control parameters in addition to the image data, for the purpose of reducing bandwidth and power requirements. In one aspect of the invention, multiple regions of interest within the video image field-of-view can be defined and controlled by a user or by a software monitoring application. The regions of interest are presented seamlessly on the display, without obscuring adjacent portions of the background image, similar to foveated displays.

In another aspect of the invention, a bandwidth allocation method and system for video transmission is disclosed; the bandwidth allocation technique processes and transmits different regions of the video image using different bandwidths, with different image quality.

In another aspect of the invention, bandwidth allocation is controlled by one or more sampling methods such as spatial sampling, temporal sampling, or color bit-depth reduction.

In another aspect of the invention, bandwidth allocation is controlled through compression methodology, specifically including wavelet-based compression similar to the JPEG 2000 standard.

In another aspect of the invention, image-processing modules throughout the system use reconfigurable logic circuits which allow algorithm or processing parameters to be changed in real-time. Image-processing modules can be connected together to process the video image in parallel and in cooperation with each other. In yet another aspect of the invention, a video processing system for capturing and communicating video images includes data and control communication channels between multiple image-processing modules processing portions of the video image in parallel and in cooperation with each other. For this configuration, to suppress boundary artifacts, boundary image data is shared among adjacent modules.

In another aspect of the invention, the reconfigurable logic circuits contained in image-processing modules consist of Field-Programmable Gate Arrays (FPGAs), whose function can be modified in real-time, either programmatically or through user input, to perform various image processing tasks.

DETAILED DESCRIPTION OF EXEMPLARY EMBODIMENTS

Figure 1:
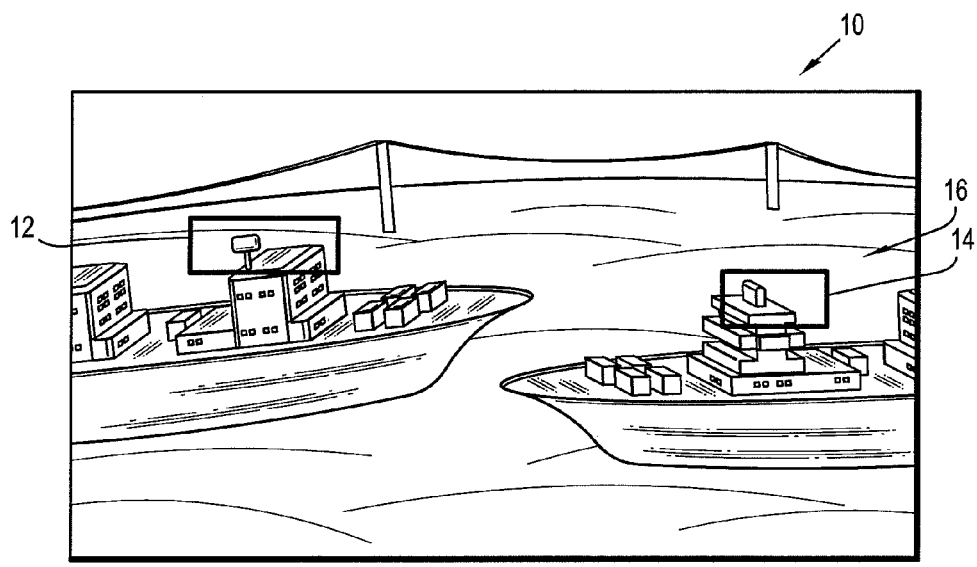
FIG. 1 is an exemplary image showing different regions of interest.

Exemplary embodiments of the invention are described with reference to the accompanying drawings, of which:

FIG. 1 is an exemplary image showing different regions of interest. An exemplary image 10 shows a typical ocean front scene with two regions of interest being the control towers of the two ships shown in the image 10. Region 12 is a fixed window showing a region of interest to a viewer. Region 14 is a roving window type region of interest. The roving window is moveable and flexible because it can be resized and changed. Typically, a viewer may want the region 12 and region 14 to be viewable at a higher resolution than the background region 16 since they are the regions of interest in the present illustration. Hence, it would be wasteful to allocate all available bandwidth to transmit the whole image at a single highest possible resolution when the different regions of the image can have different resolutions and frame rate.

Figure 2:
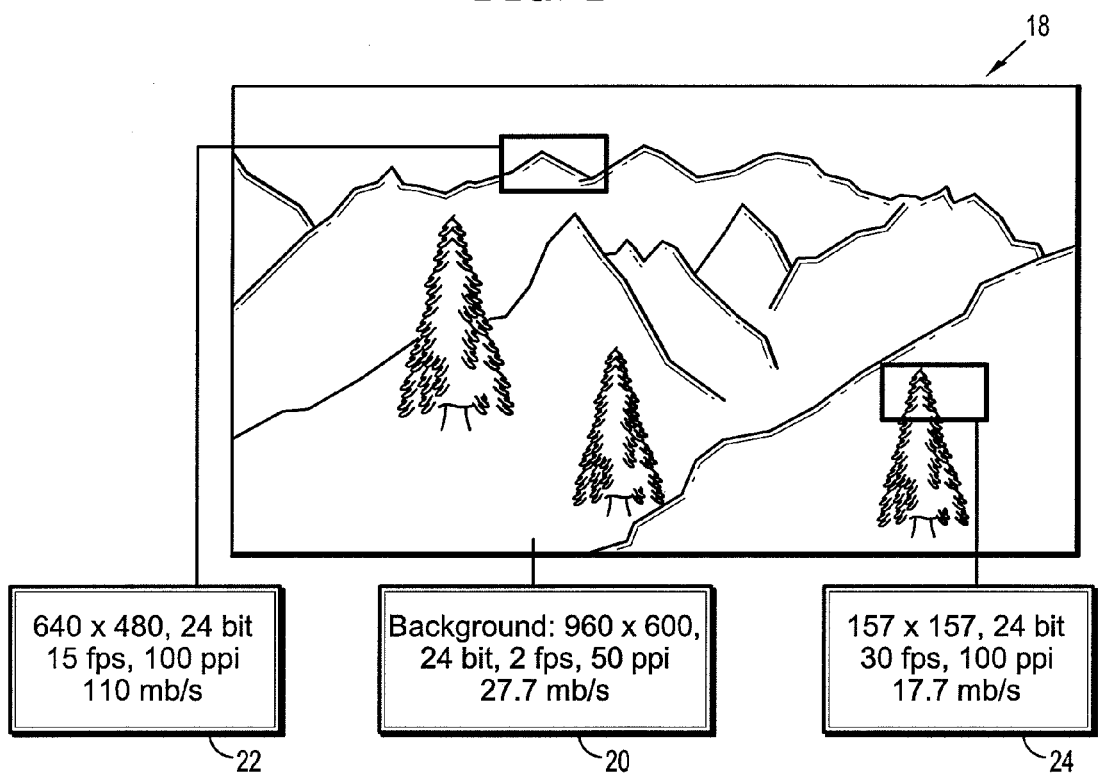
FIG. 2 is an exemplary image showing different bandwidth requirements for the various parts of the image.

FIG. 2 is an exemplary image showing different bandwidth requirements for the various parts of the image. Image 18 includes a region 20, which is the background in the image 18; region 22 is a fixed window region; and region 24 is a roving window. In the present example, the overall resolution of the image 18 is 1920×1200 pixels, with a 24-bit depth; video sampling rate of 30 frames per second (fps), 100 pixels per inch (ppi) and the image is transmitted over a 1.66 Gb/s bandwidth.

In the present example, the overall video resolution and bandwidth is distributed as described next. Fixed window region 22 has a resolution of 640×480 pixels, 24 bit, 15 fps, 100 ppi at 110 Mb/s; and the roving window region 24 is 157×157 pixels, 30 fps, 100 ppi and 17.7 Mb/s. Hence, the background region of the image is sampled at a lower rate of 2 fps as compared to the fixed window region 22 at 15 fps and roving window region 24 at 30 fps. Therefore, the background region requires a low bandwidth of 27.7 Mb/s as compared to the fixed window region 22 at 110 Mb/s and roving window region 24 requires 17.7 Mb/s. Optimal use of bandwidth can be achieved by dedicating a larger portion of the available bandwidth to the regions of interest and a smaller portion of the available bandwidth to the regions of non-interest. Thus, the available bandwidth can be optimally distributed between different regions of interest and the total requirement of bandwidth can be reduced by assigning higher bandwidth to the regions of interest and lower bandwidth to other regions.

The above described system can be implemented in an exemplary embodiment to provide optimal bandwidth utilization by using different resolutions and frame rates for different parts of the image. Foveated displays can display images where regions of interest are shown at a different resolution than the non-interest regions. Exemplary regions of interest are considered to be of two types, one a roving window, and another a fixed window (See FIGS. 1, 2 and 3).

Figure 3:
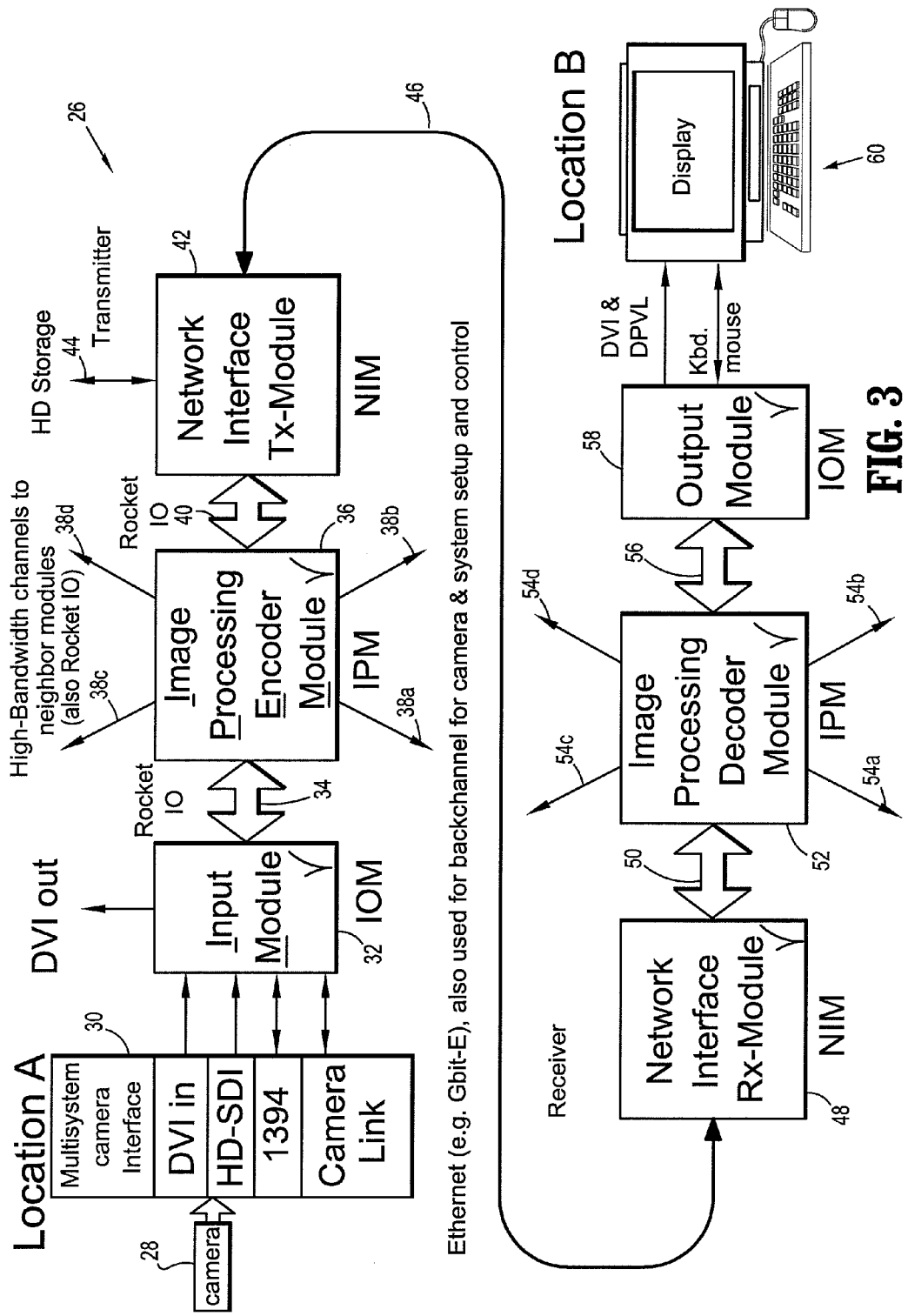
FIG. 3 shows an illustrative system for image processing in an exemplary embodiment of the invention.

FIG. 3 shows an illustrative system for image processing according to an exemplary embodiment of the present invention. System 26 is a modular system that is used to capture, transmit and reconstruct an image. System 26 enables intelligent image processing and transmission, enabling very high quality video applications (for example, surveillance) with a high degree of situational awareness, with relatively minimal bandwidth requirements.

As an example, a two location arrangement is shown, where location A is the image capture location and location B is the image reconstruction location. Both transmit and receive sides of the imaging/communication chain contain identical hardware modules which makes operation in half-duplex or full-duplex mode possible, and the system can include a backchannel for two-way communication. To provide configuration flexibility each module can include one or more Field Programmable Gate Arrays (FPGAs) Integrated Circuits (ICs). The FPGAs within the modules can be used to customize the firmware for each application because they are reprogrammable and reconfigurable hardware components.

A camera 28 captures a video image that is transmitted over an input interface 30 to an Input Module (IM) 32. The input interface 30 can be one or more of a multi-system camera interface, Digital Video Interface (DVI), High Definition Serial Digital Interface (HD-SDI), IEEE 1394 or CAMERA LINK raw camera link. Those skilled in the art will appreciate that the above listed types of inputs in the input interface 30 are only illustrative and any other camera interface can be used in the input interface 30.

The input module 32 receives the video captured by the camera 28. The input module 32 can convert the input video image into a format suitable for practical transmission throughout the multi-module system (physically ROCKET-IO with XILINX AURORA protocol or other protocols such as INFINIBAND and Fibrechannel). The input module 32 can further perform image sampling and filtering for background and regions of interest. Such sampling and filtering can include spatial, temporal and bit-depth sampling.

The input module 32 can handle a variety of input video signals and convert them to other digital computer formats. For example, the input module 32 can convert DVI-IN, HD-SDI, IEEE 1394 or raw Camera Link video data into DVI or ROCKET-IO format. Protocols and hardware compliant with AURORA (from XILINIX) INFINIBAND standards or Fibrechannel standards can be used to interface the input module 32 with other networking or image processing apparatus. Further, the input module 32, being a modular part, can be used in other video applications requiring such conversion and/or sampling facilities provided by the input module 32.

As the system 26 is modular, the IPEM 36 module can be interfaced to other image processing modules through connection points 38a-d to create a parallel image processing network. The IPEM 36 includes processing logic and other reconfigurable logic elements. The IPEM 36 can perform multiple image processing tasks. For example, the IPEM 36 can be configured to perform video compression, motion detection, target detection and object tracking. As the IPEM 36 includes reconfigurable system logic, which can be implemented using FPGAs, it can be configured or reconfigured to perform a variety of image processing tasks. To suppress boundary artifacts, boundary image data is shared among adjacent modules.

A link 40 connects the IPEM 36 module to a network interface, Tx module 42. The link 40 can be a high-speed link running a high-speed I/O protocol (for example, ROCKET I/O). The network interface Tx module 42 converts data from the high speed I/O format to a network protocol. For example, the network interface Tx module 42 can convert video data transmitted using the ROCKET I/O format to an Ethernet format. Such converted data is transmitted over a network link 46 to be sent to the receiving location B, potentially a very long distance away from transmitting location A.

At the receiving location B, a network interface Rx module 48 converts the received video data from a network transmission format to a high-speed format. For example, the network interface Rx module 48 can convert Ethernet format data into the ROCKET I/O format. An Image Processing Decoder Module (IPDM) 52 converts the formatted video data into video data suitable for displaying or for further processing. For example, the IPDM 52 can convert compressed image data into uncompressed image data or change the encoded video data into decoded video data. The IPDM 52 can be networked with other IPDM 52 modules to form a parallel processing network using connection points 54a-c.

A link 56 connects the IPDM 52 to an output module 58 that generates output signals. The output module 58 can be interfaced to an exemplary display terminal 60 that can include an output device and an input device such as a keyboard or a mouse. The output module 58 can generate video in multiple formats, for example, DVI and DPVL formats.

The system 26 is modular and hence may use similar modules for the transmit side location A and receive side location B. For example, the IPEM 36 and IPDM 52 are reprogrammable, and hence can be programmed to perform encoding or decoding. All the modules in the system 26 can be reprogrammed remotely. For example, a terminal or a device on the receiving side can reprogram the input module remotely and change the functioning of the input side devices such as the camera, input module 32 and the IPEM 36 modules remotely through a network. Hence, the receiving modules can be located remote from the camera and input modules.

Modularity enables module-to-module communication. Further, the system capacity can be enhanced or modified to accommodate different types of images (e.g., larger images) without redesigning the system because modular components can be added or removed at the module-to-module interfaces. Hence, modularity and re-programmability features of the system 26 provide cost-savings and flexibility in configuring the system.

The roving window, fixed windows and background regions of the image captured by the camera 28 are shown to a user on the display 60. The user receives the video wherein the roving window and the fixed window regions of the video are shown on the display with higher image quality, as compared to the background of the video image, to create a foveated display. The aspects of higher image quality within the region of interest can include higher spatial resolution, higher temporal sampling, higher color bit-depth, or higher quality compression.

The user selects the roving window and the fixed window locations and dimensions using the display terminal 60 attachments such as a mouse and a keyboard. These locations and dimensions are communicated to the IPEM 36. The IPEM 36 controls the frame rate of the different regions of interest in the image and builds a coherent video image by integrating the video image for different regions of interest. When the image data is transmitted over a network link 46, bandwidth is optimally utilized because different image regions are being transmitted at variable frame rate depending upon whether it is a fixed window, a roving window or a background.

The user of the system can independently control the complete system. For example, the user can control in real-time: spatial sampling, temporal sampling, color bit-depth and compression quality. Further, the user can control regions of interest and the background along with their sizes, locations, resolutions, quality, frame rate and hence also the bandwidth utilization. Other video capture and video processing parameters can also be controlled by sending control signals to the image transmission system's components.

In different exemplary embodiments of the invention, the control signals for controlling or modifying of the video processing by the IOM 32, IPEM 36 and the network interface Tx module 42 (the transmission side of the image processing process) can be sent from an external software, hardware device or through a user input supplied via an input device coupled to the output module 58. In at least one exemplary embodiment, the control signals can be carried over the network link 46 or through a dedicated control link (not shown) in addition to the network link 46 that links the transmission and receiving sides of the image processing process.

In at least one embodiment of the invention, an example of a spatial sampling scheme for a regular array of square RGB pixels would be a checkerboard pattern, in which the periodicity of the pattern could be selected as a multiple of the native resolution of the captured image. For a factor of two reduction in the number of transmitted pixels, the spatial sampling pattern for a checkerboard would sample every third pixel in each row of the image, with the first sample in each row offset by one pixel for alternate rows. For larger reduction ratios, every forth, fifth, or larger number of pixels would be sampled in each row. Typically, the spatial sampling for the background portion of the image would be set to a factor of two or larger reduction ratio, whereas for the regions of interest, the spatial sample would contain all the pixels in that portion of the captured image, at the native resolution of the camera. The quality of the sampled background image could then be improved, for example, by application of a Gaussian filter algorithm to smooth the sampled pixel data.

An example of a simple temporal sampling scheme is to sample every second frame for a factor of two reduction in transmitted data rates. Larger reduction ratios can be achieved by sampling every third, forth, or larger number of frames. For slow moving targets, frame rates as low as a few frames per second may be acceptable. However, for fast moving targets frame rates as high as the system will allow, typically 30 frames per second or 60 frames per second, may be needed.

Standard compression techniques can be applied separately to the regions of interest and the background portion of the video image. An example of a wavelet-based compression technique, particularly suited for selective transmission of different output components, is JPEG-2000. As discussed previously, a large reduction in video data and bandwidth is achieved through foviation and spatial and temporal sampling of the background portion of the video image, without the need to also apply compression. Consequently, it is possible to apply compression solely to the regions of interest. The choice of application of compression to various parts of the video image is dictated by the nature of the video imaging application, the requirements to track movements and spatial details of targets, and the availability of system bandwidth.

Those skilled in the art will appreciate that the above listed user controls are illustrative, and that a system can be configured to provide any kind of user control to manipulate the system's operational parameters, dependent upon the application requirements.

Multiple regions of interest (See FIGS. 1 and 2). can be defined (and controlled via user input from the output 58) via module 32 and the IPEM 36. For example, in an exemplary embodiment directed to surveillance applications, these regions of interests can be set by the user to a fixed position within the field or be moved in real time via an input device. Alternately, the size and location of regions of interest can be automatically set by a software application. For example, the software application can analyze the video data to identify and track targets meeting certain criteria that can be predetermined or can be selected by a user. In another setting, such as high-resolution video conferencing, the system could be reconfigured in half- or full-duplex mode to send multiple regions of interest simultaneously in both directions. The software which automatically controls the region of interest need not process the full frame resolution.

The image generated at the display system 60 is a seamless image incorporating regions of interest at a higher resolution and/or frame rate as compared to the other regions in the video. Hence, a user of such a system receives an enhanced view of the regions of interest. Further, due to controlled apportioning of bandwidth between regions of interest and other regions, optimal use of bandwidth is made possible.

The modules used in the system 26 are reconfigurable, with new configurations downloaded either from local storage within each module, or through the network. The modules used to build the input module 32, IPEM 36, network interface Tx module 42, network interface Rx module 48, IPDM 52 and Output Module (OM) 58 can be constructed using FPGAs to provide reconfigurability. For example, the programmable FPGAs can be reconfigured to adapt to the changing needs for bandwidth control, image quality or application.

The FPGAs in the IPEM 36 and IPDM 52 can be reprogrammed if the application requires various parameter reconfigurations, such as detailed compression, bandwidth control, and image analysis. For example, an application that previously captured video in one spectral band may need to process video in another spectral band. In such a case, the operation of the FPGA in the IPEM 36 can be modified to handle the new spectral band by reconfiguring it to process compression, bandwidth control, image analysis, etc., for the new spectral band. Hence, the ability to reconfigure the FPGAs in the modules of the system 26 makes the system 26 suitable for a wide range of applications.

In at least one embodiment of the invention, a digital, modular video processing and communication system in at least one exemplary embodiment combines foveated display methodology and conventional compression to reduce the bandwidth requirements for transmission of video images. The system allows either user directed or automated control of bandwidth allocation between multiple regions of interest in the video image. The system packetizes the video signal for wireless transmission or transmission over a network, and includes image-processing circuits with reconfigurable logic. A communication channel and an additional control communication channel between receiving and transmitting portions of the system allows reprogramming of various logic functions. Hence, all elements of capture, transmission, encoding, packetization, decoding, and reconstruction can be reconfigured in real-time. The system is modular, containing communication channels between image-processing modules, allowing scaleable expansion for parallel processing of larger video images.

Figure 4:
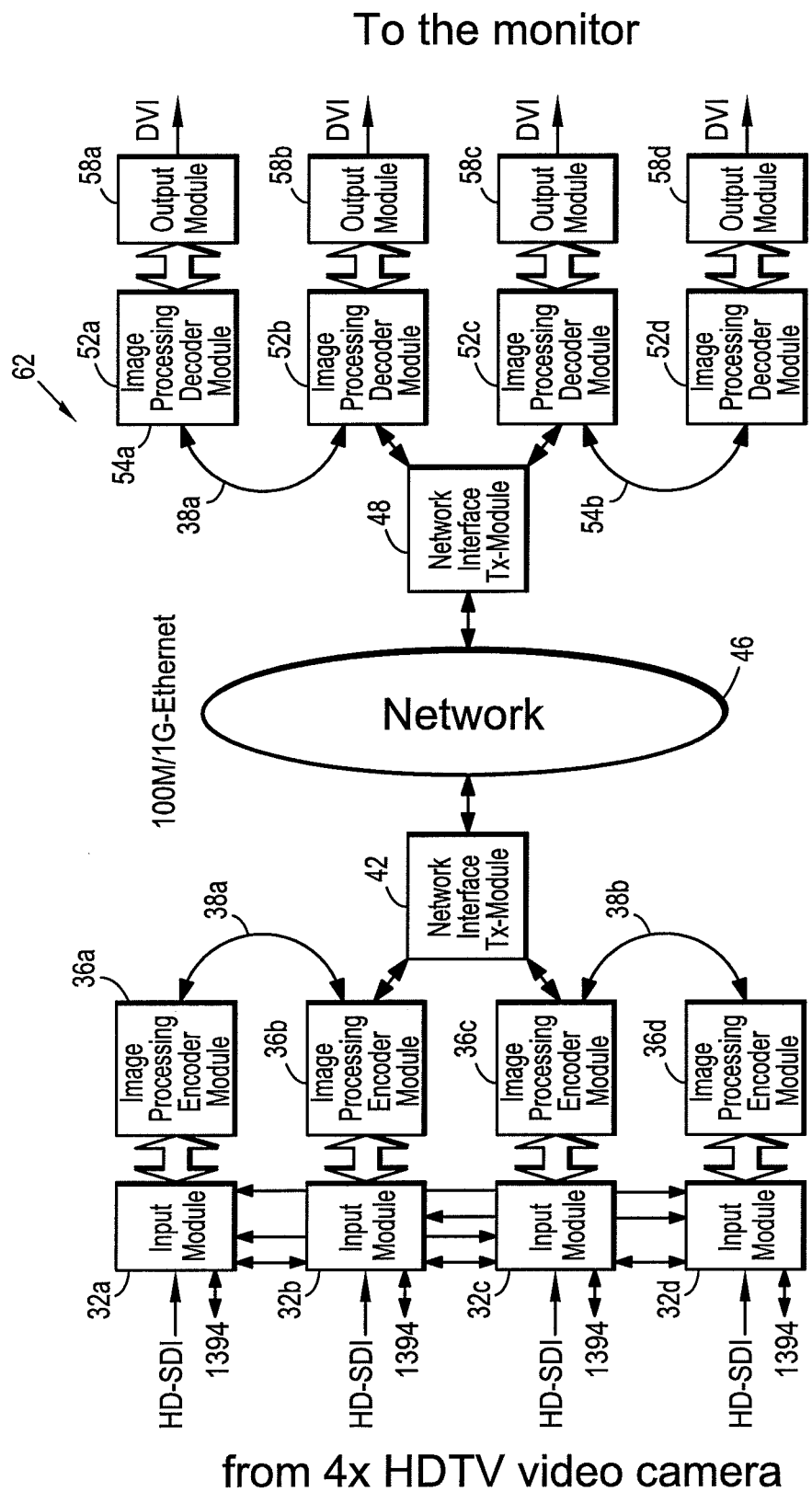
FIG. 4 shows an illustrative image processing network in an exemplary embodiment of the invention.

FIG. 4 shows an illustrative image-processing network in an exemplary embodiment of the present invention. An image processing system 62 is a networked version of the system described above in context of FIG. 3. The input side of the system receives 4× High Definition Television (HDTV) inputs from different video camera signals that are transmitted over High Definition Serial Digital Interface (HD-SDI), IEEE 1394, Digital Video Input (DVI-D) and/or CAMERALINK to four interconnected input modules 32a-32d. Each of the input modules is connected to the corresponding IPEMs 36a-36d.

The IPEMs 36a and 36b are interconnected using a connection point 38a. The IPEMs 36c and 36d are interconnected using a connection point 38b. The IPEMS 36b and 36c are connected to the network interface Tx module 42 that is connected to the network link 46. The network link 46 transmits video data to the network interface Tx module 48. Four IPDM 58a-58d are interconnected using connection points 54a and 54b. Each of the IPDM 58a-58d is connected to a corresponding output module 58a-d. The network system 62 uses interconnected IPEMs 36a-36d and interconnected IPDMs 52a-52d to create a parallel network of image processing elements to process 4×HDTV inputs in the present example. Each HDTV input has a typical resolution of 1920× 1080 and hence four such inputs provide very high resolution that would require scaling up of the image processing system. Instead, due to the modular nature of the system, it is possible to interconnect image-processing elements to provide the required scaled-up ability to process 4×HDTV video inputs.

Figure 5:
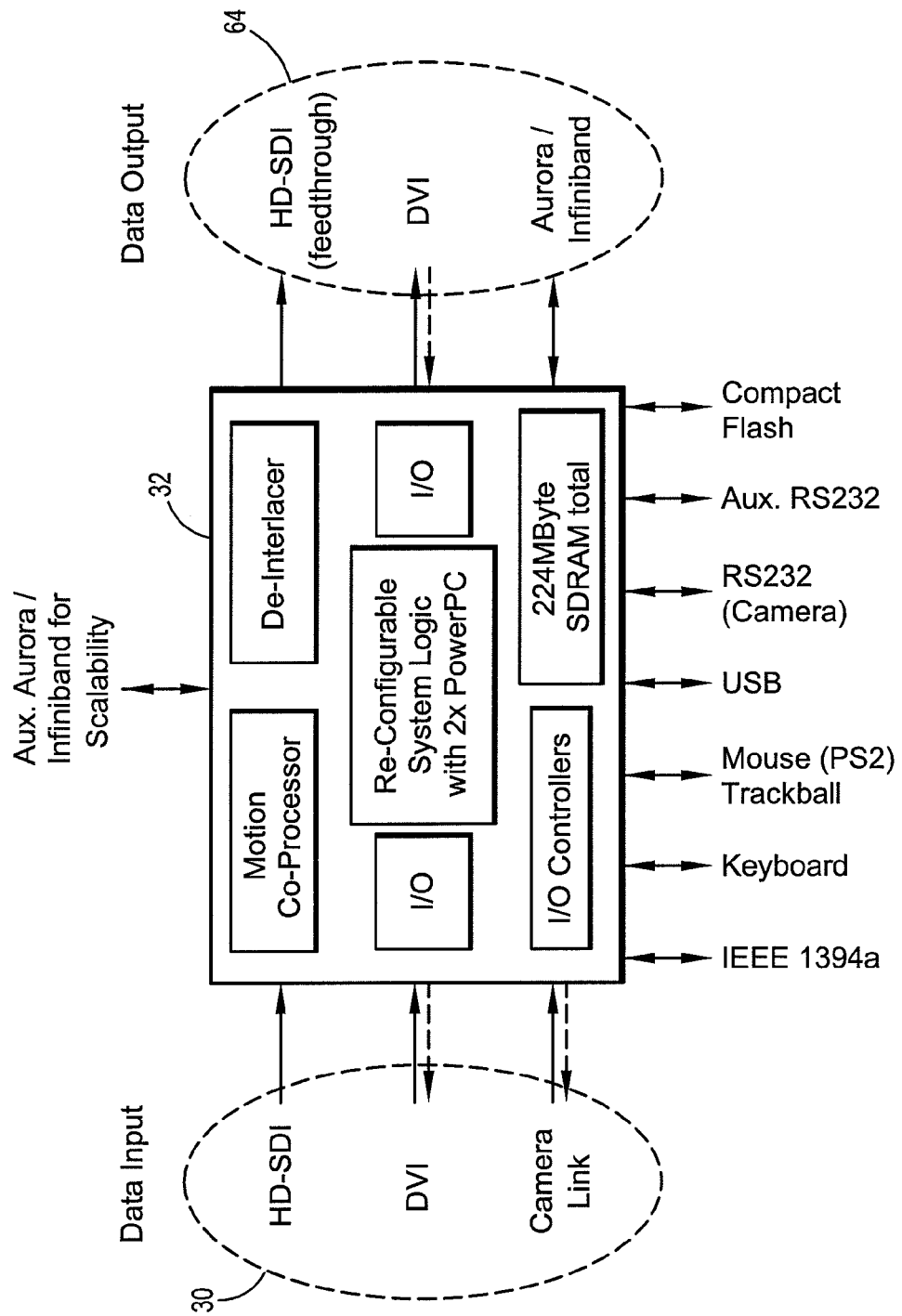
FIG. 5 shows an illustrative input-output module in an exemplary embodiment of the invention.

FIG. 5 shows an illustrative input-output module 64 in an exemplary embodiment of the invention. The input module 32 is shown as an illustration and the same module can be configured to be an output module 58. The input module 32 includes reconfigurable system logic, Random Access Memory (RAM), I/O units, I/O controllers, motion co-processor to process the video data and a de-interlacer. The data input is in the form of video signals from the input interface 32 in any format such as a Digital Video Input (DVI) signal, High Definition Serial Digital Interface (HD-SDI) signal, IEEE 1394 signal and a video camera signal. The processed output from an output interface 64 can also be in any format such as a Digital Video Input (DVI) signal, High Definition Serial Digital Interface (HD-SDI) signal, IEEE 1394 signal and a video camera signal. Both the input module 32 and the output module 58 can have control inputs that can receive control signals to reprogram the FPGAs inside the modules and change their functionality in real-time.

Figure 6:
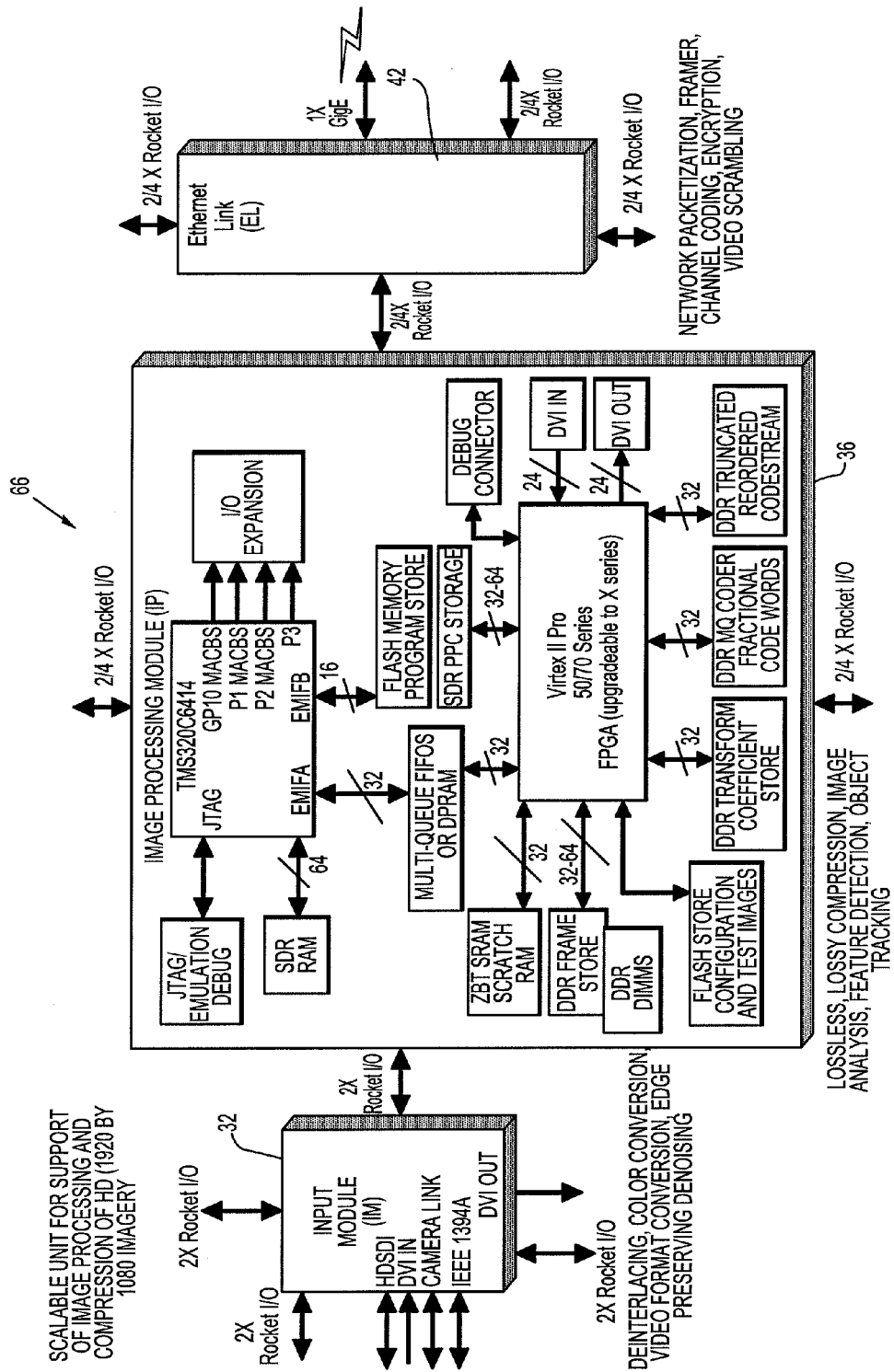
FIG. 6 shows an illustrative image processing module in an exemplary embodiment of the invention.

FIG. 6 shows an illustrative image-processing module 36 in an exemplary embodiment of the invention. In a system section 66, the IPEM 36 and IPDM 52 modules perform image processing. Both the IPEM 36 and IPDM 52 can be built using a common reconfigurable image-processing module as described next. Both the IPEM 36 and IPDM 52 can have control inputs that can receive control signals to reprogram the FPGAs inside the modules and change their functionality in real-time. The ability to reconfigure is provided in the image-processing module 36 by using FPGA circuit elements.

A processor (not shown) is included in the image-processing module 36 to perform the image processing tasks such as lossy or lossless compression, image analysis, feature detection and object tracking. For example, JPEG-2000 compression can be used to compress one or more parts of the video image data. Hence, using a reconfigurable image-processing module provides flexibility in constructing both the IPEM 36 and IPDM 52 and also provides a cost advantage.

Figure 7:
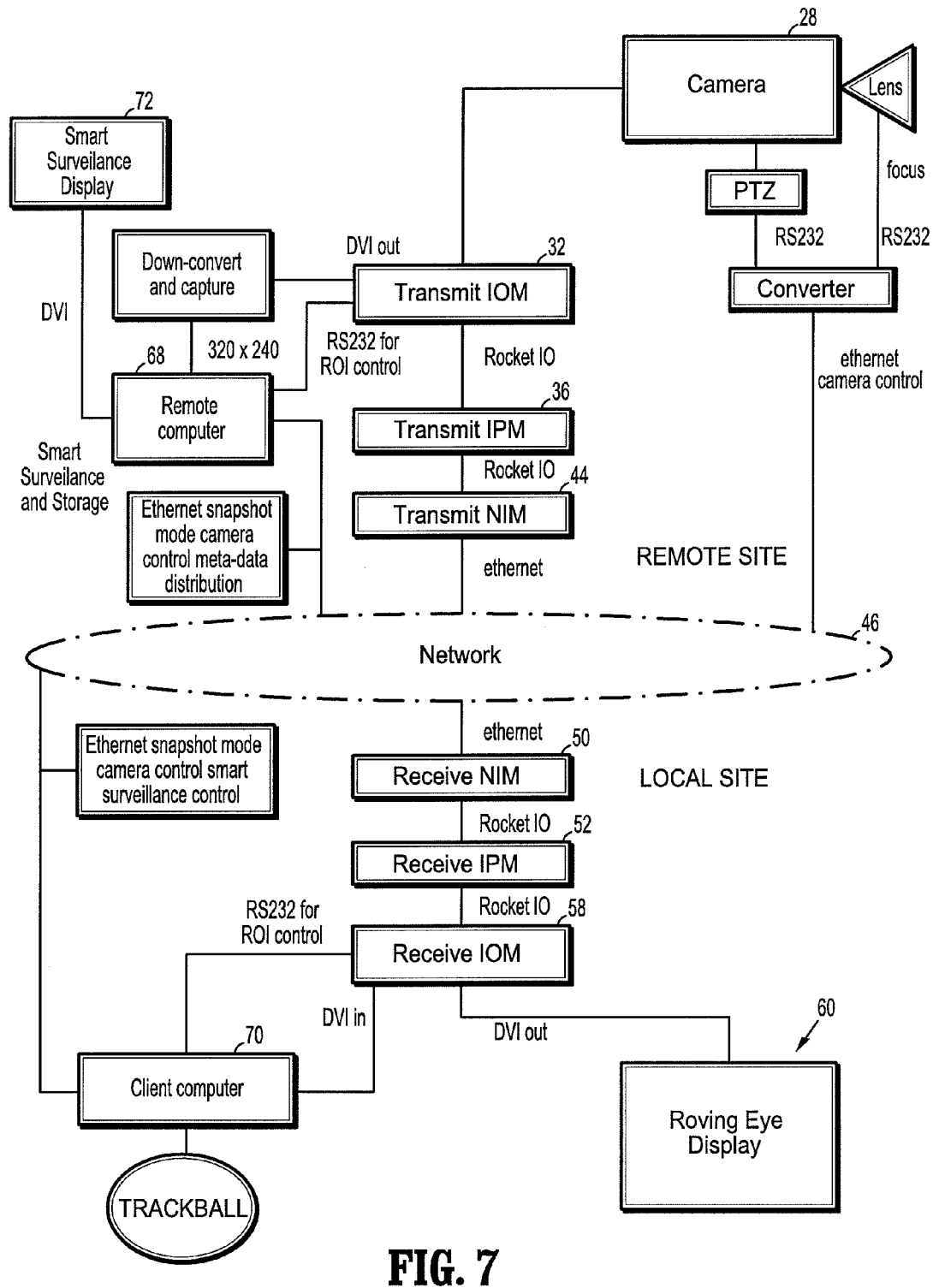
FIG. 7 is a block diagram of an exemplary embodiment of a video processing system for selective capture, transmission, and reconstruction of a video image for surveillance applications.

FIG. 7 shows an exemplary embodiment of the invention for selective capture, transmission, and reconstruction of video surveillance image data over a network. Computers 68 and 70 are located on both the remote capture and local receive sides of the system. The remote site computer system 68 includes hardware for video capture and if necessary down-conversion to a lower resolution, compatible with a software application (not shown) processing the video data. The software application locates and tracks targets, sets the region of interest, and tags the video data with meta-data describing features of the captured video scenes. Appropriate samples of video data are stored locally, for archive or other analysis purposes. On the local site, the local site client computer 70 is used to provide user control information on the display 60, superimposed with the video data.

Figure 8:
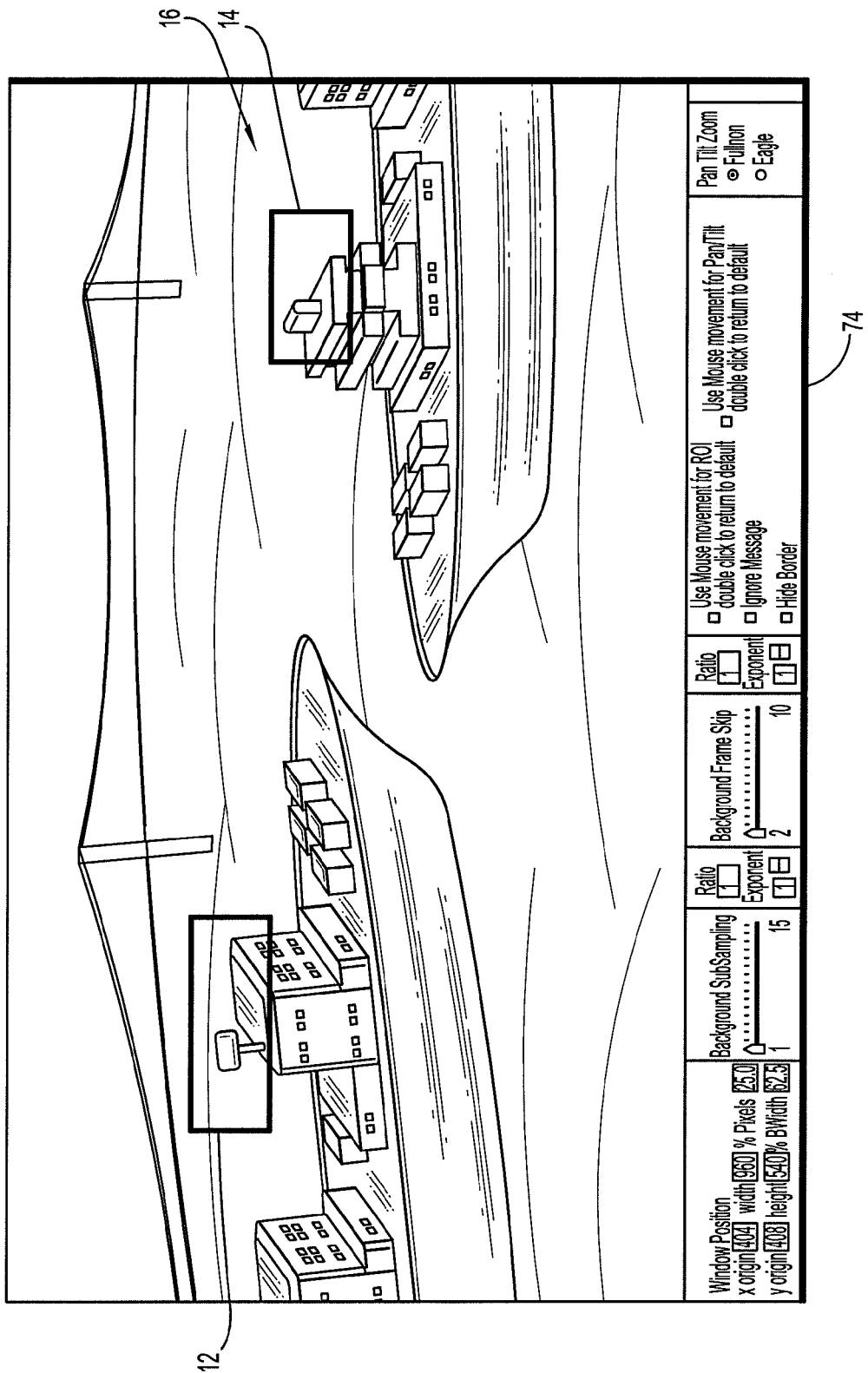
FIG. 8 shows an exemplary embodiment with a user interface having a task bar rendered on the display screen in addition to the video image.

FIG. 8 shows a user interface with a task bar 74 rendered on the display screen in addition to the video image in an exemplary embodiment of the invention; wherein the task bar contains information about bandwidth throughput and a choice of parameters for bandwidth allocation of regions of interest, and parameters for image-capture and camera control. The user control information is contained within a task bar, juxtaposed to the video data and located at the bottom of the screen. The video surveillance data is overlaid on the client computer video output, to juxtapose the control information and surveillance video image. A chroma-key method can be used in the receive IOM module 58 (See FIG. 3) to overlay the video data with the user control data. An infrequently occurring color is chosen such that it will unlikely occur in the image data. In at least one embodiment, the client computer sets all pixel data other than the task bar data to full magenta (R=255, G=0, B=255). The receive IOM unit passes all client computer pixel data to the display, except for full magenta pixel data, which is replaced with the surveillance data.

The task bar control information includes controls for the multiple regions of interest, camera tilt, pan, focus and zoom control, and other camera image capture parameters. The user controls for region of interest can override the automatic software controls for region of interest on the remote site. Also, the user can capture single-frame snapshots of video data. Through the use of a trackball or other pointing device, the local site user has complete control over the parameters governing the region of interest, namely location, size, spatial, and temporal sampling.

While the present invention has been particularly shown and described with reference to exemplary embodiments thereof, it will be understood by those skilled in the art that various changes in form and details may be made therein without departing from the spirit and scope of the present invention as defined by the appended claims.

What is claimed is:

1. A video processing system for generating a foveated video display with sections having different resolutions, the system comprising:
    a network channel for communicating video images comprising at least first and second video sections, wherein the first video section's resolution is higher than the second video section's resolution;
    a video transmission system for processing the video images received from an image capturing device and transmitting the processed video images over the network channel by assigning a larger portion of the network channel's bandwidth to the first video section and a smaller bandwidth portion for the second video section;
    a video receiving system for receiving the video images from the video transmission system, reconstructing the video images, and seamlessly combining the first and second video sections of different resolutions to form an output video image on a display device; and
    a control unit for sending one or more video control parameters from the video receiving system to the video transmission system to control the capturing and processing of the video images,
    wherein the one or more video control parameters include a selection of a portion of the video images that comprises the first video section and a portion of the video images that comprises the second section.

2. The video processing system of claim 1 wherein the network channel, the video transmission system, the video receiving system and the control unit comprising:
    components which can be dynamically reconfigured to alter the video processing system's functionality.

3. The system of claim 1, further comprising:
    an additional network channel for sending the video control parameters from the control unit to the video transmission system.

4. The system of claim 1, wherein the video control parameters comprising:
    at least one of a video capture parameter to control the capturing of video images, and a video processing parameter to control the processing of the video images by the video transmission system.

5. The system of claim 1, wherein the video control parameters are sourced through at least one of a software application, a hardware device and a user.

6. The system of claim 1, wherein the video control parameters are at least one of a predetermined video parameter or a user-defined video parameter.

7. The system of claim 1, wherein the video control parameters comprising:
individual sizes and locations of the first and second video sections, wherein the first and second video sections are regions of interest and the sizes and locations of the video sections are specified by the user.

8. The system of claim 1, wherein the video transmission system controls bandwidth allocation of the network channel and the image quality of the video images.

9. The system of claim 1, wherein the video transmission system performs at least one of a spatial sampling, a temporal sampling and a bit-depth processing on the video images.

10. The system of claim 1, wherein the video transmission system performs compression on the video images and the video receiving system performs decompression on the video images.

11. The video processing system of claim 10, further comprising: component modules which can be dynamically reconfigured to alter system functionality.

12. A method for communicating video images to create a foveated display, the method comprising the steps of:
processing one or more video images captured using an image-capturing device;
transmitting over a network channel, at least one first region of the video images at higher resolution than a second region of the video images, wherein the at least one first region of the video image is additionally transmitted over the network channel at either temporal sampling rate a higher color bit depth or a higher quality compression than the second region of the video images; and
reconstructing the video images received from the network channel to create a seamless output image showing the first region at a higher resolution than the second region.

13. The method of communicating video images of claim 12, further comprising the step of:
reconfiguring dynamically, the capture, processing and transmission of the video images.

14. The method of claim 12 further comprising the step of:
displaying the output image on a display device.

15. The method of claim 12, wherein an external control signal controls the sizes and locations of the regions of interest and the external control signal is supplied by at least one of a software application, a hardware device and a user.

16. The method of claim 12 further comprising the steps of:
compressing the video images before transmitting over the network channel; and
decompressing the video images received from the transmission over the network channel.

17. The method of claim 12 further comprising the step of:
controlling the allocation of the bandwidth of the network channel between the first and second regions of the video images.

18. A method for communicating video images to create a foveated display, the method comprising the steps of:
processing one or more video images captured using an image-capturing device;
dividing the video images into at least one background section, at least one fixed window, and at least one roving window;
transmitting over a network channel, the at least one fixed window and the at least one roving window of the video images at higher resolution than the at least one background section of the video images; and
reconstructing the video images received from the network channel to create a seamless output image showing the at least one fixed window and the at least one roving window at a higher resolution than the second region.

* * * * *